United States Patent [19]

Perry

[11] 3,987,609
[45] Oct. 26, 1976

[54] GARDEN TOOL
[75] Inventor: Jerry L. Perry, Pacific Grove, Calif.
[73] Assignee: The Raymond Lee Organization, Inc., New York, N.Y. ; a part interest
[22] Filed: Mar. 31, 1976
[21] Appl. No.: 672,113

Related U.S. Application Data
[63] Substitute for Ser. No. 430,655, Jan. 4, 1974, abandoned.

[52] U.S. Cl. ............................................. 56/400.05
[51] Int. Cl.² .......................................... A01D 7/10
[58] Field of Search....... 56/400.04, 400.05, 400.06, 56/400.17; 172/375

[56] References Cited
UNITED STATES PATENTS

| | | | |
|---|---|---|---|
| 2,268,066 | 12/1941 | Brooke | 56/400.05 |
| 2,314,685 | 3/1943 | Brooke | 56/400.05 X |
| 2,413,827 | 1/1947 | Herst | 56/400.17 |
| 3,181,620 | 5/1965 | Lowery | 172/375 |
| 3,654,754 | 4/1972 | Scoggin, Jr. et al. | 56/400.17 |
| 3,724,188 | 4/1973 | Eads | 56/400.17 |

*Primary Examiner*—Russell R. Kinsey

[57] ABSTRACT

A manually operable garden tool combines the functions of rake and weeder with separate sections used for weeding and raking.

2 Claims, 4 Drawing Figures

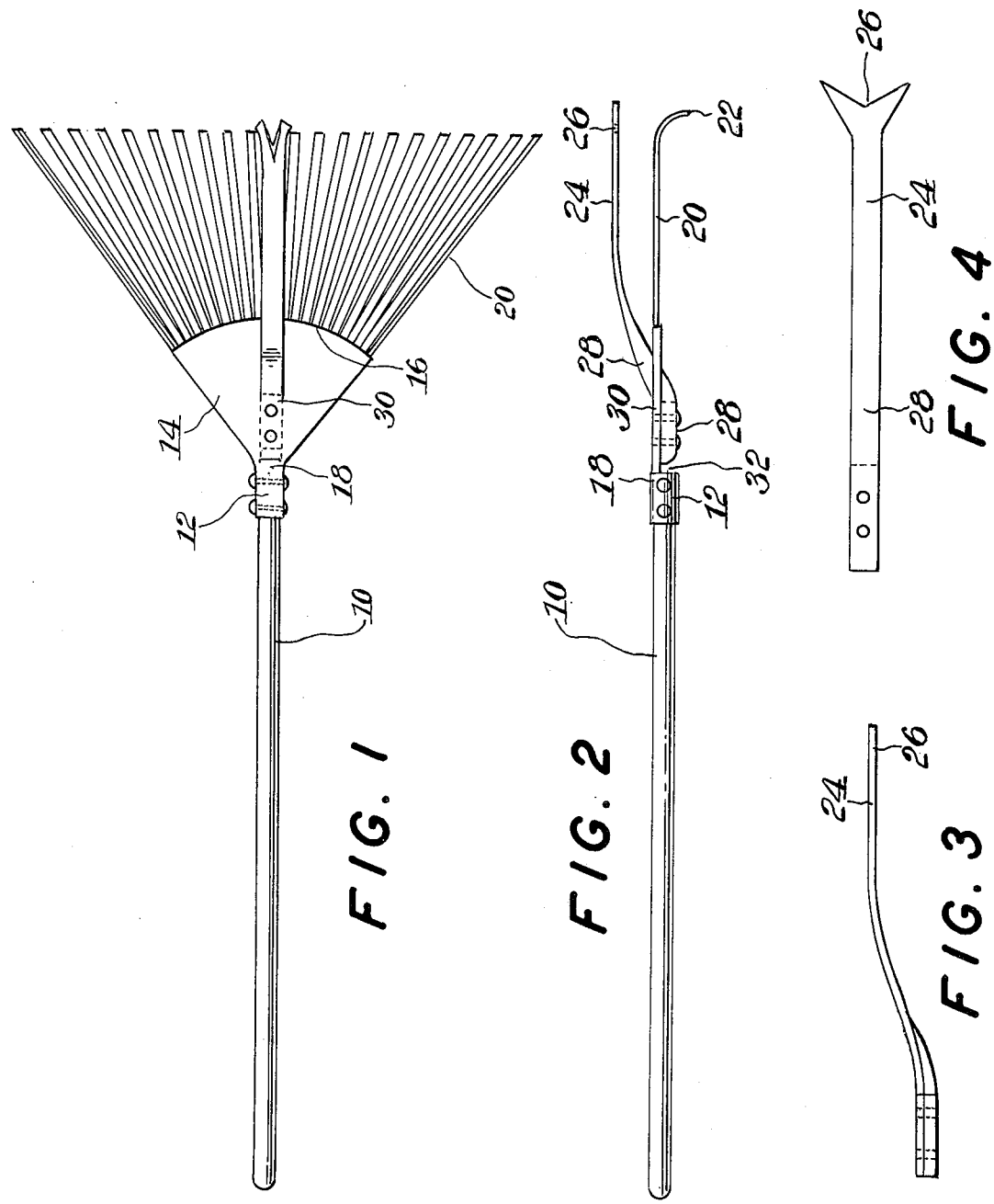

GARDEN TOOL

CROSS REFERENCE TO RELATED APPLICATIONS

This application is a substitute for a now abandoned application Ser. No. 430,655, filed Jan. 4, 1974.

SUMMARY OF THE INVENTION

This invention is directed toward a manually operable gardening tool which can be used either as weeder or as a rake whereby the user can weed or rake in one operation without having to use separate tools for this purpose.

The tool employs an elongated handle with a generally flat section coplanar with the handle associated therewith. The section defines a circular sector, the center of the circle of which the sector is a part being disposed at an end of the sector and secured to one end of the handle. The sector has an oppositely disposed curved periphery.

A plurality of spring tines essentially coplanar with the section are provided. Each tine is secured at one end to the curved periphery and extends outward at right angles whereby the handle, tines and section define a rake.

An elongated weed blade extends in the same direction as the handle and is secured at one end to the one end of the handle. The other end of the blade lies in a plane parallel to the tines. The blade and handle form the weeder.

In use, the tool is disposed as a rake with the blade above the tines. The tool can then be turned around with blade disposed below the tines whereby the tool can be used as a weeder.

BRIEF DESCRIPTION OF THE DRAWINGS

In the drawings:

FIG. 1 is a top plan view of the invention.

FIG. 2 is a side view thereof;

FIG. 3 is a side view of the weeder blade used in the invention; and

FIG. 4 is a plan view of the blade of FIG. 3.

DETAILED DESCRIPTION OF PREFERRED EMBODIMENTS

Referring now to FIGS. 1–4, an elongated handle 10 is secured by sleeve 12 at one end 32 to a flat generally coplanar section 14. Section 14 defines a sector with a curved outer periphery 16 and a region 18 connected to the sleeve which is coincident with the center of the circle of which the sector is a part.

Spring tine 20 essentially coplanar with the section 14 are secured at one end to the periphery 16 and extend or fan outwards at right angles thereto and disposed away from one major surface thereof.

A shoulder portion 28 integral with portion 24 extends through opening 30 in section 14, which is disposed intermediate handle and tines, and is secured to end 32.

The handle and blade form a weeder. The tool can be converted from use either as weeder to rake and vice versa merely by rotating the handle through a 180° arc.

While I have described my invention with particular reference to the drawings, such is not to be considered as limiting its actual scope.

I claim:

1. A garden tool comprising:
   an elongated handle;
   a generally flat section coplanar with the handle and defining a circular sector, the center of the circle of which the sector is a part being disposed at one end of the sector, said one sector end being secured to one end of the handle, the sector extending outward from the handle and having a curved outer periphery, said sector having an opening disposed intermediate the handle and said curved periphery;
   a plurality of flat spring tines essentially coplanar with the section, said tines being each secured at one end to the curved periphery and extending radially outward, said tines having teeth at the other ends which extend outward from the same side of all tines at right angles thereto, said tines, section and handle defining a rake; and
   an elongated weeder blade extending in the direction of the handle parallel to the plane of the sector and disposed remote from the same side of the tines out of which the teeth extend, one end of the blade being adjacent said tips, the other end of the blade forming a bent shoulder which extends through said sector opening and is then secured to said sector.

2. The tool of claim 1 wherein said teeth are disposed along a line at right angles to the direction of elongation of the handle, and said one end of the blade has a cutting edge and recess.

* * * * *